United States Patent
Li et al.

(10) Patent No.: US 12,199,861 B2
(45) Date of Patent: Jan. 14, 2025

(54) METHOD AND SYSTEM FOR DETERMINING PACKET FORWARDING PATH, AND NETWORK NODE

(71) Applicant: Huawei Technologies Co., Ltd., Shenzhen (CN)

(72) Inventors: Cheng Li, Beijing (CN); Zhibo Hu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 523 days.

(21) Appl. No.: 17/469,201

(22) Filed: Sep. 8, 2021

(65) Prior Publication Data

US 2021/0409321 A1   Dec. 30, 2021

Related U.S. Application Data

(63) Continuation of application No. PCT/CN2020/076932, filed on Feb. 27, 2020.

(30) Foreign Application Priority Data

Mar. 8, 2019   (CN) .......................... 201910175452.6

(51) Int. Cl.
*H04L 45/00* (2022.01)

(52) U.S. Cl.
CPC ............ *H04L 45/566* (2013.01); *H04L 45/22* (2013.01)

(58) Field of Classification Search
CPC ....... H04L 45/566; H04L 45/22; H04L 45/28; H04L 45/50; H04L 45/34; H04W 12/088; H04W 12/10
See application file for complete search history.

(56) References Cited

U.S. PATENT DOCUMENTS

| | | | |
|---|---|---|---|
| 2016/0099864 A1 | 4/2016 | Akiya et al. | |
| 2016/0173366 A1* | 6/2016 | Saad ..................... | H04L 45/22 370/389 |

(Continued)

FOREIGN PATENT DOCUMENTS

| | | |
|---|---|---|
| CN | 101227248 A | 7/2008 |
| CN | 102611569 A | 7/2012 |

(Continued)

OTHER PUBLICATIONS

A. Bashandy, et al., "Topology Independent Fast Reroute using Segment Routing," draft-bashandy-rtgwg-segment-routing-ti-lfa-02, Jan. 19, 2018, 12 pages.

Bashandy, A., et al., "Topology Independent Fast Reroute using Segment Routing," draft-ietf-rtgwg-segment-routing-ti-lfa-00, Jun. 3, 2019, 19 pages.

(Continued)

*Primary Examiner* — Ricky Q Ngo
*Assistant Examiner* — Kabir U Jahangir
(74) *Attorney, Agent, or Firm* — Conley Rose, P.C.

(57) ABSTRACT

A method includes obtaining, by a first network node, a first segment identifier advertisement message, where the first segment identifier advertisement message includes a first segment identifier and a first flag bit, and the first segment identifier is corresponding to a second network node; determining, by the first network node, that the first flag bit indicates that a packet needs to be forwarded through the second network node; and generating, by the first network node, a first packet forwarding path, where the first packet forwarding path includes the second network node.

20 Claims, 7 Drawing Sheets

(56) References Cited

U.S. PATENT DOCUMENTS

| | | |
|---|---|---|
| 2017/0064717 A1 | 3/2017 | Filsfils et al. |
| 2017/0244631 A1 | 8/2017 | Guichard |
| 2017/0250908 A1* | 8/2017 | Nainar .................... H04L 45/04 |
| 2018/0077051 A1* | 3/2018 | Nainar .................. H04L 45/745 |
| 2018/0219783 A1 | 8/2018 | Pfister et al. |
| 2018/0316161 A1 | 11/2018 | Notarfrancesco et al. |
| 2018/0359599 A1 | 12/2018 | Cherry et al. |
| 2018/0359699 A1 | 12/2018 | Strong et al. |
| 2019/0036818 A1 | 1/2019 | Nainar |
| 2019/0058654 A1 | 2/2019 | Nainar |
| 2020/0099610 A1* | 3/2020 | Heron .................... H04L 45/22 |
| 2020/0153732 A1* | 5/2020 | Negi ....................... H04L 47/34 |
| 2020/0153733 A1* | 5/2020 | Chunduri ................ H04L 45/30 |
| 2021/0092052 A1 | 3/2021 | Tantsura et al. |
| 2021/0176168 A1* | 6/2021 | Eckert .................. H04L 45/302 |

FOREIGN PATENT DOCUMENTS

| | | |
|---|---|---|
| CN | 105704019 A | 6/2016 |
| CN | 108702331 A | 10/2018 |
| CN | 108809759 A | 11/2018 |
| CN | 109076018 A | 12/2018 |
| CN | 109981458 A | 7/2019 |

OTHER PUBLICATIONS

Litkowski, S., et al., "Implementing non protected paths using SPRING," draft-litkowski-spring-non-protected-paths-02, Feb. 10, 2018, 14 pages.

Deering, et al., "Internet Protocol, Version 6 (IPv6) Specification," Request for Comments: 8200, Jul. 2017, 421 pages.

* cited by examiner

US 12,199,861 B2

METHOD AND SYSTEM FOR DETERMINING PACKET FORWARDING PATH, AND NETWORK NODE

CROSS-REFERENCE TO RELATED APPLICATIONS

This application is a continuation of International Patent Application No. PCT/CN2020/076932, filed on Feb. 27, 2020, which claims priority to Chinese Patent Application No. 201910175452.6, filed on Mar. 8, 2019. Both of the aforementioned applications are hereby incorporated by reference in their entireties.

TECHNICAL FIELD

The present disclosure relates to the communications field, and in particular, to a method and system for determining a packet forwarding path, and a network node.

BACKGROUND

Segment routing (SR) is a protocol designed based on a source routing concept to forward a data packet in a network. The segment routing supports explicitly specifying a forwarding path of the data packet on a source node. The SR may be deployed on two data planes, a multiprotocol label switching (MPLS) data plane and an Internet Protocol version 6 (IPv6) data plane. When the SR is deployed on the MPLS data plane, the SR is referred to as SR-MPLS. When the SR is deployed on the IPv6 data plane, the SR is referred to as IPv6 Segment Routing (SRv6).

When an SR network forwards a packet, an ingress node in the SR network calculates a packet forwarding path after receiving the packet. Several intermediate nodes forward the packet in sequence, so that the packet finally reaches a destination address. Some key nodes, for example, a firewall node, exist in the network. For network security, at least some data needs to be forwarded through the key node. However, in some approaches, an SR network node usually relies on a shortest path first algorithm to calculate a packet forwarding path, and it cannot be ensured that a packet definitely passes through a specific node.

SUMMARY

A method and system for determining a packet forwarding path, a network node device are provided, to resolve a technical problem that in an SR network, it cannot be ensured that a packet forwarding path includes a specific node.

According to a first aspect, a method for determining a packet forwarding path is provided. The method includes, a first network node obtains a first segment identifier advertisement message, where the first segment identifier advertisement message includes a first segment identifier and a first flag bit, and the first segment identifier is corresponding to a second network node; the first network node determines that the first flag bit indicates that a packet needs to be forwarded through the second network node; and the first network node generates a first packet forwarding path, where the first packet forwarding path includes the second network node.

According to the foregoing method, the first network node determines, by using a flag bit combined with a segment identifier, that a packet needs to be forwarded through a network node corresponding to the segment identifier. Therefore, when a packet forwarding path is generated, the second network node is included in the forwarding path. The second network node may be a key node in a network. According to the method, it can be ensured that the generated packet forwarding path includes a key node in the network, and prevent the packet from being forwarded by bypassing the key node. For example, when the key node is a firewall, it is ensured that the packet needs to pass through the firewall. This improves network security.

In a possible design, the method further includes, the first network node generates a second packet forwarding path, where the second packet forwarding path includes the second network node, the first packet forwarding path is different from the second packet forwarding path, the first packet forwarding path is a primary path, and the second packet forwarding path is a first backup path of the first packet forwarding path. The first network node not only generates the primary path, but also generates the backup path, and the backup path also includes the key node in the network, namely, the second network node. The backup path may be a fast reroute (FRR) path in an SR network. When a network node or a link is faulty, a packet is forwarded through the FRR path, to implement data protection. In this way, when the primary path is faulty, data is still forwarded through the backup path without bypassing the key node. This ensures the network security.

In a possible design, the method further includes, the first network node receives a first packet that includes a segment list, where a topmost segment identifier in the segment list is a segment identifier corresponding to the primary path; the first network node determines that the second network node is unreachable through the primary path; the first network node replaces the segment identifier that is corresponding to the primary path and that is in the segment list with a segment identifier corresponding to the backup path, to generate a second packet; and the first network node sends the second packet to the second network node. In the SR network, the segment list is used to guide packet forwarding. Segment identifiers in the segment list in sequence specify an explicit forwarding path, and each segment identifier in the segment list is corresponding to one network node. The top segment identifier is corresponding to a next-hop network node. Replacement between the primary path and the backup path is performed through replacement of the top segment identifier.

In a possible design, the method further includes, the first network node generates a forwarding entry, where the forwarding entry includes the segment identifier corresponding to the primary path and the segment identifier corresponding to the backup path. Optionally, the forwarding entry is stored in the first network node.

In a possible design, the first segment identifier is a node segment identifier of the second network node; or the first segment identifier is an adjacent segment identifier of a link of the first network node, and the first network node is connected to the second network node through the link. A node segment identifier and a link segment identifier are two types of segment identifier types in the SR network. The adjacent segment identifier of the link of the first network node is advertised by the first network node and is corresponding to the second network node connected to the link. When the first segment identifier is the node segment identifier of the second network node, that a first network node obtains a first segment identifier advertisement message may be as follows. The second network node generates the first segment identifier advertisement message and sends the first segment identifier advertisement message to the first network node, and the first network node receives the first segment identifier advertisement message sent by the second network node. When the first segment identifier is the adjacent segment identifier of the link of the first network node, the first segment identifier advertisement message is generated by the first network node, that is, the first network node obtains the first segment identifier advertisement message.

In a possible design, when the first segment identifier is the adjacent segment identifier of the link of the first network node, the method further includes, the first network node receives a control message sent by a controller; the first network node generates the first segment identifier advertisement message including the first segment identifier and the first flag bit, where the first flag bit is used to indicate that the packet needs to be forwarded through the second network node; and the first network node sends the first segment identifier advertisement message to another node in a network.

In a possible design, when the first segment identifier is the adjacent segment identifier of the link of the first network node, the method further includes, the first network node receives a second segment identifier advertisement message, where the second segment identifier advertisement message includes a second segment identifier and a second flag bit, and the second segment identifier is a node segment identifier of the second network node; the first network node determines that the second flag bit indicates that the packet needs to be forwarded through the second network node; the first network node generates the first segment identifier advertisement message including the first segment identifier and the first flag bit, where the first flag bit is used to indicate that the packet needs to be forwarded through the second network node; and the first network node sends the first segment identifier advertisement message to another node in a network.

When a segment identifier advertisement message includes an adjacent segment identifier, setting information of a flag bit in the segment identifier advertisement message has two sources, one is that the controller sends the control message, and the other is that a corresponding flag bit in the node segment identifier advertisement message is learned. According to the two source manners, the first network node obtains the setting information of the flag bit, sets the corresponding flag bit, and generates the segment identifier advertisement message by combining the segment identifier with the flag bit, to indicate the packet to be forwarded through the key node in the network.

In a possible design, the method further includes, the first network node obtains a third segment identifier advertisement message, where the third segment identifier advertisement message includes a third segment identifier and a third flag bit, and the third segment identifier is corresponding to the second network node; the first network node determines that the third flag bit indicates that the packet does not need to be forwarded through the second network node; the first network node generates a third packet forwarding path, where the third packet forwarding path does not include the second network node, and the third packet forwarding path is a second backup path of the first packet forwarding path; and the first network node receives a first packet that includes a segment list, where a topmost segment identifier in the segment list is a segment identifier corresponding to the primary path, the first network node determines that the first packet is a first-type packet, the first network node determines that the second network node is unreachable through the primary path, and replaces the segment identifier that is corresponding to the primary path and that is in the segment list with a segment identifier corresponding to the first backup path, to generate a second packet, and the first network node sends the second packet to the second network node; or the first network node receives a third packet that includes a segment list, where a topmost segment identifier in the segment list is a segment identifier corresponding to the primary path, the first network node determines that the third packet is a second-type packet, the first network node determines that the second network node is unreachable through the primary path, and replaces the segment identifier that is corresponding to the primary path and that is in the segment list with a segment identifier corresponding to the second backup path, to generate a fourth packet, and the first network node continues to forward the fourth packet. The segment identifier advertisement message may include two types. For a network intermediate node, one type of segment identifier advertisement message indicates that a backup path needs to include a related network node, and the other type of segment identifier advertisement message indicates that a backup path does not need to include a related network node, so that the backup path is selected and used when the primary path is faulty. This flexibly restricts a packet forwarding path.

In a possible design, the method further includes, the first network node receives a first packet, and determines that the first packet is a first-type packet; and the first network node determines a segment list corresponding to the first packet forwarding path, and the first network node pushes the segment list into the first packet, to generate a second packet, and forwards the second packet based on the segment list.

In a possible design, the first network node obtains a third segment identifier advertisement message, where the third segment identifier advertisement message includes a third segment identifier and a third flag bit, and the third segment identifier is corresponding to the second network node; the first network node determines that the third flag bit indicates that the packet does not need to be forwarded through the second network node; the first network node generates a third packet forwarding path, where the third packet forwarding path does not include the second network node; the first network node receives a third packet, and determines that the third packet is a second-type packet; and the first network node determines a segment list corresponding to the third packet forwarding path, and the first network node pushes the segment list into the third packet, to generate a fourth packet, and forwards the fourth packet based on the segment list. The segment identifier advertisement message may include two types. For a network ingress node, one type of segment identifier advertisement message indicates that a packet forwarding path needs to include a related network node, and the other type of segment identifier advertisement message indicates that a packet forwarding path does not need to include a related network node, so that the packet forwarding path is selected and used when the packet forwarding path is generated. This flexibly restricts the packet forwarding path.

In a possible design, a priority of the first-type packet is higher than a first threshold, or a security requirement level of the first-type packet is higher than a first threshold, that is, the first-type packet is a packet with a high security requirement.

In a possible design, a priority of the second-type packet is lower than a second threshold, or a security requirement level of the second-type packet is lower than a second threshold, that is, the second-type packet is a packet with a low security requirement.

The first network node may be an ingress node for forwarding a packet in an SR network. In this case, the first network node performs different forwarding operations based on a type of the received packet. For a packet with a high security requirement, for example, a financial packet, the packet may be forcibly forwarded through a key node. For a packet with a low security requirement, for example, a live video streaming broadcast packet, the packet may be forcibly forwarded without passing through a key node. In this way, requirements of both network security and network reachability are met.

In a possible design, the second network node is a firewall.

According to a second aspect, a method for determining a packet forwarding path is provided. The method includes, a second network node generates a first segment identifier advertisement message, where the first segment identifier advertisement message includes a first segment identifier and a first flag bit, and the first flag bit indicates that a packet forwarding path needs to pass through a network node corresponding to the first segment identifier; and the second network node sends the first segment identifier advertisement message to a first network node, where the first flag bit indicates that a first packet forwarding path generated by the first network node passes through the network node corresponding to the first segment identifier.

According to the foregoing method, the second network node indicates, by using a flag bit combined with a segment identifier, that a packet forwarding path generated by the first network node needs to pass through a network node corresponding to the segment identifier, to ensure that the packet forwarding path includes a key node in a network, prevent data from being forwarded by bypassing the key node, and ensure network security.

In a possible design, the first segment identifier is a node segment identifier of the second network node; or the first segment identifier is an adjacent segment identifier of a link of the second network node, the second network node is connected to a third network node through the link, and the third network node is the network node corresponding to the first segment identifier.

In a possible design, when the first segment identifier is the adjacent segment identifier of the link of the second network node, that a second network node generates a first segment identifier advertisement message includes, the second network node receives a control message sent by a controller, where the control message indicates that the packet forwarding path needs to pass through the network node corresponding to the first segment identifier; and the second network node generates the first segment identifier advertisement message including the first segment identifier and the first flag bit, where the first flag bit is used to indicate that the packet forwarding path needs to pass through the second network node.

In a possible design, when the first segment identifier is the adjacent segment identifier of the link of the second network node, that a second network node generates a first segment identifier advertisement message includes, the second network node receives a second segment identifier advertisement message, where the second segment identifier advertisement message includes a second segment identifier and a second flag bit, and the second segment identifier is a node segment identifier of the third network node; the second network node determines that the second flag bit indicates that a packet needs to be forwarded through the third network node; and the second network node generates the first segment identifier advertisement message including the first segment identifier and the first flag bit, where the first flag bit is used to indicate that the packet forwarding path needs to pass through the second network node.

In a possible design, the method further includes, the second network node generates a third segment identifier advertisement message, where the third segment identifier advertisement message includes a third segment identifier and a third flag bit, the third flag bit indicates that the packet forwarding path does not need to pass through a network node corresponding to the third segment identifier, and the network node corresponding to the third segment identifier is a same node as the network node corresponding to the first segment identifier; and the second network node sends the third segment identifier advertisement message to the first network node, where the third flag bit indicates that a third packet forwarding path generated by the first network node does not pass through the network node corresponding to the first segment identifier.

According to a third aspect, a method for determining a packet forwarding path is provided. The method includes, a first network node obtains a first segment identifier advertisement message, where the first segment identifier advertisement message includes a first segment identifier and a first flag bit, and the first segment identifier is corresponding to a second network node; the first network node determines that the first flag bit indicates that a packet does not need to be forwarded through the second network node; and the first network node generates a first packet forwarding path, where the first packet forwarding path does not include the second network node.

According to a fourth aspect, a network node is provided, to perform the method performed by the first network node in any one of the first aspect or the possible implementations of the first aspect. The network node includes units configured to perform the method in any one of the first aspect or the possible implementations of the first aspect.

According to a fifth aspect, a network node is provided, to perform the method performed by the second network node in any one of the second aspect or the possible implementations of the second aspect. The network node includes units configured to perform the method in any one of the second aspect or the possible implementations of the second aspect.

According to a sixth aspect, a network node is provided. The network node includes a processor, a network interface, and a memory. The network interface may be a transceiver. The memory may be configured to store program code, and the processor is configured to invoke the program code in the memory to perform the method according to any one of the first aspect or the possible implementations of the first aspect. Details are not described herein again.

According to a seventh aspect, a network node is provided. The network node includes a processor, a network interface, and a memory. The network interface may be a transceiver. The memory may be configured to store program code, and the processor is configured to invoke the program code in the memory to perform the method according to any one of the second aspect or the possible implementations of the second aspect. Details are not described herein again.

According to an eighth aspect, a network node is provided, where the network node is a first network node in a plurality of network nodes. The plurality of network nodes further include a second network node, and the first network node includes a main control board and an interface board. The main control board includes a first processor and a first memory. The interface board includes a second processor, a second memory, and an interface card. The main control board and the interface board are coupled.

The first memory may be configured to store program code. The first processor is configured to invoke the program code in the first memory to perform the following operations, obtaining a first segment identifier advertisement message, where the first segment identifier advertisement message includes a first segment identifier and a first flag bit, and the first segment identifier is corresponding to a second network node; determining that the first flag bit indicates that a packet needs to be forwarded through the second network node; and generating a first packet forwarding path, where the first packet forwarding path includes the second network node.

According to a ninth aspect, a network node is provided, where the network node is a second network node in a plurality of network nodes. The plurality of network nodes further include a first network node, and the network node includes a main control board and an interface board. The main control board includes a first processor and a first memory. The interface board includes a second processor, a second memory, and an interface card. The main control board and the interface board are coupled. The first memory may be configured to store program code. The first processor is configured to invoke the program code in the first memory to perform the following operations, generating a first segment identifier advertisement message, where the first segment identifier advertisement message includes a first segment identifier and a first flag bit, and the first flag bit indicates that a packet forwarding path needs to pass through a network node corresponding to the first segment identifier.

The second memory may be configured to store program code. The second processor is configured to invoke the program code in the second memory, to trigger the interface card to perform the following operation, sending the first segment identifier advertisement message to a first network node, where the first flag bit indicates that a first packet forwarding path generated by the first network node passes through the network node corresponding to the first segment identifier.

In a possible implementation, an inter-process communication (IPC) channel is established between the main control board and the interface board, and the main control board and the interface board communicate with each other through the IPC channel.

According to a tenth aspect, a system for determining a packet forwarding path is provided. The system includes the network node provided in the fourth aspect and the network node provided in the fifth aspect. Alternatively, the system includes the network node provided in the sixth aspect and the network node provided in the seventh aspect. Alternatively, the system includes the network node provided in the eighth aspect and the network node provided in the ninth aspect.

According to an eleventh aspect, a computer storage medium is provided. The computer storage medium is configured to store a computer software instruction used by the foregoing network node, and the computer storage medium includes a program used to perform the foregoing aspect.

According to a twelfth aspect, a computer program product including a computer program instruction is provided. When the computer program product is run on a network node, the network node is enabled to perform the method provided in any one of the first aspect, the second aspect, the possible implementations of the first aspect, or the possible implementations of the second aspect.

BRIEF DESCRIPTION OF DRAWINGS

To describe the technical solutions in the present disclosure more clearly, the following briefly describes the accompanying drawings used in embodiments. It is clearly that the accompanying drawings in the following description merely show some embodiments of the present disclosure, and a person of ordinary skill in the art can derive other technical solutions and accompanying drawings from these accompanying drawings without creative efforts.

DESCRIPTION OF EMBODIMENTS

The following describes embodiments of the present disclosure with reference to the accompanying drawings.

Figure 1:
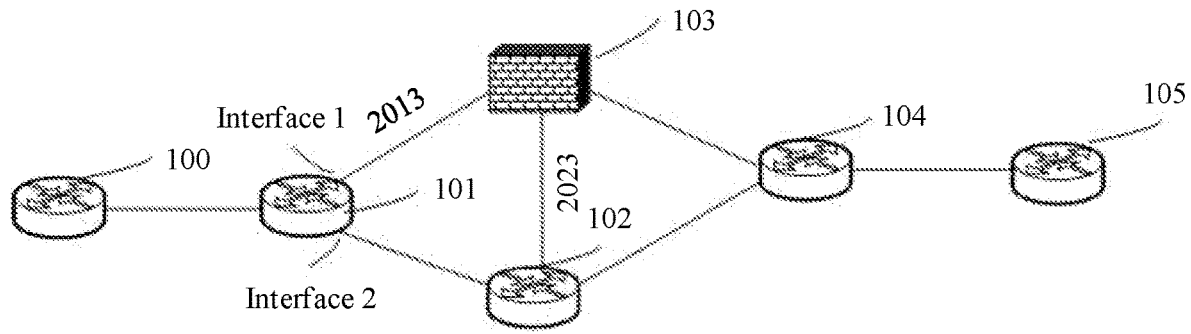
FIG. 1 is a schematic diagram of a network scenario according to an embodiment of the present disclosure.

FIG. 1 shows a possible application scenario according to an embodiment of the present disclosure. The application scenario includes an SR network. The SR network includes several network nodes such as a network node 100, a network node 101, a network node 102, a network node 103, a network node 104, and a network node 105. A segment identifier of the network node 100 is 1000, a segment identifier of the network node 101 is 1001, a segment identifier of the network node 102 is 1002, a segment identifier of the network node 103 is 1003, a segment identifier of the network node 104 is 1004, and a segment identifier of the network node 105 is 1005. A segment identifier of a link between the network node 101 and the network node 103 is 2013, and a segment identifier of a link between the network node 102 and the network node 103 is 2023. When a packet is forwarded from the network node 100 to the network node 105, the network node 100 is referred to as an ingress node in the SR network, and the network node 105 is referred to as an egress node in the SR network. In this embodiment of the present disclosure, the network node 100, the network node 101, the network node 102, the network node 104, and the network node 105 are forwarding devices for example, a router or a switch, in the network. The network node 103 is a firewall, and may be considered as a key node in the network. When a data packet reaches the network ingress node 100 in the SR network, the network node 100 parses a destination address of the data packet, computes a packet forwarding path based on the destination address, and generates a segment list corresponding to the packet forwarding path. For example, for a packet whose destination address is the network node 105, a packet forwarding path is obtained through calculation based on an algorithm constraint condition, and for example, a forwarding path is obtained through calculation based on a minimum cost, and the forwarding path reaches the network node 105 through the network node 101, the network node 102, and the network node 104, where a cost of the path is the smallest. A generated segment list may be [1001, 1002, 1004, 1005]. In a process in which the packet is forwarded from the network node 100 to the network node 105, the packet sequentially passes through the network node 101, the network node 102, and the network node 104, and finally reaches the network node 105. In this case, the packet does not pass through the firewall node 103, and a network security risk exists.

The embodiments of the present disclosure provide a method for determining a packet forwarding path, and a network node and a system for determining a packet forwarding path that are based on the method. The method, the network node, and the system are based on a similar concept. Principles of resolving problems by the method, the network node, and the system are similar. Therefore, for the embodiments of the method, the network node, and the system, refer to each other, and same or similar content is not described.

Figure 2:
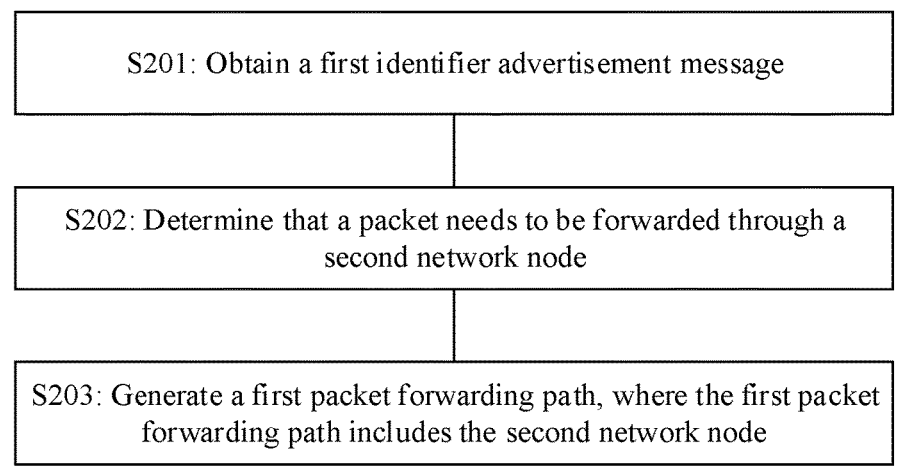
FIG. 2 is a schematic flowchart of a method for determining a packet forwarding path according to an embodiment of the present disclosure.

Referring to FIG. 2, an embodiment of the present disclosure provides a method for determining a packet forwarding path. The method includes the following steps.

S201. A first network node obtains a first segment identifier advertisement message, where the first segment identifier advertisement message includes a first segment identifier and a first flag bit, and the first segment identifier is corresponding to a second network node.

In an example, the first segment identifier is a node segment identifier, and that the first segment identifier is corresponding to a second network node means that the first segment identifier is a node segment identifier of the second network node. That a first network node obtains a first segment identifier advertisement message means that the first network node receives the first segment identifier advertisement message sent by the second network node, and the first segment identifier advertisement message is generated by the second network node. Referring to FIG. 1, the first network node is the network node 100, the second network node is the network node 103, the first segment identifier may be the node segment identifier 1003 of the network node 103, and the first segment identifier 1003 is corresponding to the second network node 103. The network node 103 generates the first segment identifier advertisement message including the segment identifier 1003 and the first flag bit, and sends the first segment identifier advertisement message to the network node 100. The first segment identifier advertisement message is first sent by the network node 103 to the network node 101, and then sent by the network node 101 to the network node 100. The network node 100 obtains the first segment identifier advertisement message.

In an example, when the first segment identifier is a node segment identifier, the network node generates the first segment identifier advertisement message based on control information sent by a controller. Referring to FIG. 1, when the first segment identifier is the node segment identifier 1003 of the network node 103, the first segment identifier advertisement message is generated by the network node 103. The network node 103 receives a control message sent by the controller, and the control message indicates that a packet needs to be forwarded through the network node 103. The network node 103 generates the first segment identifier advertisement message including the node segment identifier 1003 and the first flag bit. The first flag bit indicates that the packet needs to be forwarded through the network node 103.

In an example, the first segment identifier is an adjacent segment identifier, and that the first segment identifier is corresponding to a second network node means that the first segment identifier is an adjacent segment identifier of a link used by an adjacent node of the second network node to connect to the second network node. That a first network node obtains a first segment identifier advertisement message means that the first network node receives the first segment identifier advertisement message sent by the adjacent node of the second network node, and the first segment identifier advertisement message is generated by the adjacent node of the second network node. Referring to FIG. 1, the first network node is the network node 100, the second network node is the network node 103, the first segment identifier may be the adjacent segment identifier 2013 of the link used by the network node 101 to connect to the network node 103, and the first segment identifier 2013 is corresponding to the second network node 103. The network node 101 generates the first segment identifier advertisement message including the segment identifier 2013 and the first flag bit, and sends the first segment identifier advertisement message to the network node 100. The network node 100 receives the first segment identifier advertisement message.

In an example, when the first segment identifier is an adjacent segment identifier, the network node generates the first segment identifier advertisement message based on control information sent by a controller, or the network node generates the first segment identifier advertisement message based on a node segment identifier advertisement message. Referring to FIG. 1, when the first segment identifier is the adjacent segment identifier of the link 2013 used by the network node 101 to connect to the network node 103, the first segment identifier advertisement message is generated by the network node 101. The network node 101 may receive a control message sent by the controller, and the control message indicates that a packet needs to be forwarded through the network node 103. The network node 101 generates the first segment identifier advertisement message including the adjacent segment identifier 2013 and the first flag bit. The first flag bit indicates that the packet needs to be forwarded through the network node 103. Alternatively, the network node 101 may receive a second segment identifier advertisement message sent by the network node 103. The second segment identifier advertisement message includes a second segment identifier and a second flag bit. The second segment identifier is the node segment identifier 1003 of the network node 103, and the second flag bit indicates that a packet needs to be forwarded through the network node 103. The network node 101 determines that the second flag bit indicates that the packet needs to be forwarded through the network node 103, and further generates the first segment identifier advertisement message including the adjacent segment identifier 2013 and the first flag bit. The first flag bit indicates that the packet needs to be forwarded through the network node 103.

S202. The first network node determines that the first flag bit indicates that a packet needs to be forwarded through the second network node.

S203. The first network node generates a first packet forwarding path, where the first packet forwarding path includes the second network node.

Referring to the application scenario shown in FIG. 1, in an example, the first network node is the network ingress node 100, and the second network node may be the node 103. The network node 103 generates the first segment identifier advertisement message. The first segment identifier advertisement message includes the first segment identifier 1003 and the first flag bit, and the first segment identifier 1003 is the node segment identifier of the network node 103. The network node 100 obtains the first segment identifier advertisement message. The network node 100 determines that the first flag bit indicates that the packet needs to be forwarded through the network node 103. The network node 100 generates the first packet forwarding path including the network node 103. The network node 100 receives a first packet, and generates, based on an indication of the first flag bit, the first packet forwarding path including the network node 103. For example, for a first packet whose destination address is the network node 105, the first packet forwarding path may pass through the network node 101, the network node 103, and the network node 104 to reach the network node 105. The first packet forwarding path includes the network node 103. Further, the network node 100 determines a segment list SID list corresponding to the first packet forwarding path, which is [1001, 1003, 1004, 1005]. The network node 100 pushes the segment list into the first packet, to generate a second packet, and forwards the second packet. For example, for a first packet whose destination address is the network node 105, the first packet forwarding path may also reach the network node 103 through the link between the network node 101 and the network node 103, and then reach the network node 105 through the network node 104. The first packet forwarding path also includes the network node 103. Further, the network node 100 determines a segment list SID list corresponding to the first packet forwarding path, which is [1001, 2013, 1004, 1005]. The network node 100 pushes the segment list into the first packet, to generate a second packet, and forwards the second packet. That is, if the first packet forwarding path includes the second network node, the segment list corresponding to the first packet forwarding path includes the segment identifier corresponding to the second network node. The segment identifier corresponding to the second network node may be the first segment identifier in the first segment identifier advertisement message obtained by the first network node, or may be another segment identifier corresponding to the second network node other than the first segment identifier. Referring to the foregoing description, the first segment identifier in the first segment identifier advertisement message obtained by the network node 100 is the node segment identifier 1003. The segment identifier included in the segment list corresponding to the first packet forwarding path may be the adjacent segment identifier 2013. Both the node segment identifier 1003 and the adjacent segment identifier 2013 are corresponding to the second network node 103. In this case, the first packet passes through the firewall node in the network in a forwarding process, to ensure network security.

Referring to the application scenario shown in FIG. 1, in an example, the first network node may be a network intermediate node 101, and the second network node may be the network node 103. The network node 103 generates the first segment identifier advertisement message. The first segment identifier advertisement message includes the first segment identifier 1003 and the first flag bit, and the first segment identifier 1003 is the node segment identifier of the network node 103. The network node 101 obtains the first segment identifier advertisement message. The network node 101 determines that the first flag bit indicates that the packet needs to be forwarded through the network node 103. The network node 101 generates the first packet forwarding path including the network node 103. It should be noted that, as the network intermediate node, the first packet forwarding path generated by the network node 101 is a segment of a path to a next hop, and may be used as a part of a complete packet forwarding path for forwarding a packet. The first packet forwarding path may be the link between the network node 101 and the network node 103, and the adjacent segment identifier of the link is [2013]. In this case, the first packet forwarding path generated by the network intermediate node 101 includes the firewall node in the network, to ensure network security.

In an example, the first network node generates a forwarding entry, and the forwarding entry includes a segment list and an outbound interface that are corresponding to a primary path. For example, the first network node is the node 101 in FIG. 1, and the node 101 generates the forwarding entry. A next-hop node corresponding to the forwarding entry is the second network node, namely, the node 103. The forwarding entry includes a segment list [2013] corresponding to the primary path, where an outbound interface of the segment list [2013] is an interface 1, and a segment list [1002, 2023] corresponding to a backup path, where an outbound interface of [1002, 2023] is an interface 2. A form of the forwarding entry may be shown in Table 1. The forwarding entry may be stored in the first network node.

TABLE 1

| Forwarding entry generated by the network node 101 | | |
| --- | --- | --- |
| Network node 103 | Segment list | Outbound interface |
| Primary path | [2013] | Interface 1 |

Figure 3:
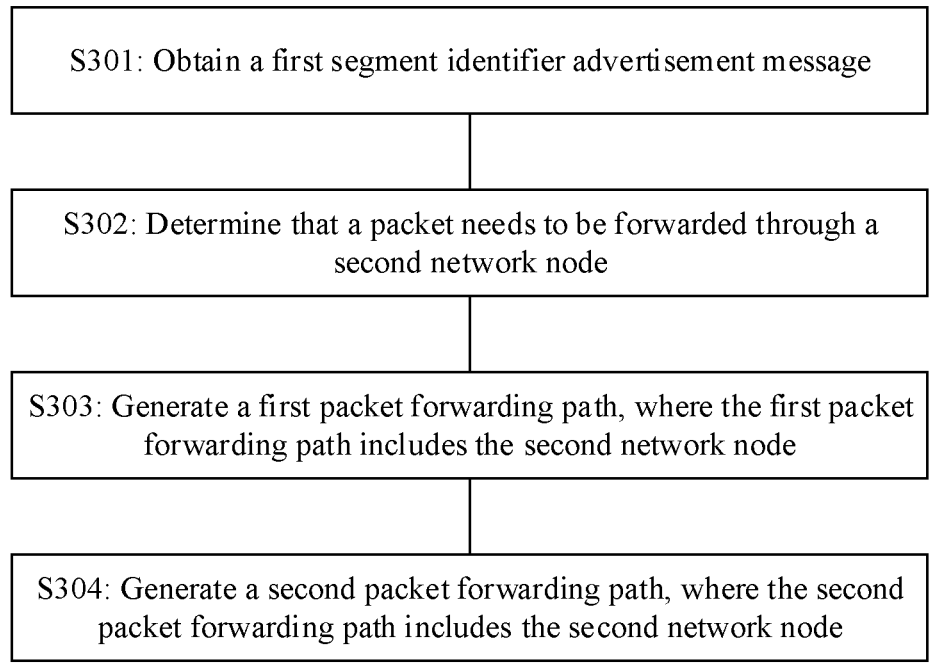
FIG. 3 is a schematic flowchart of a method for determining a packet forwarding path according to an embodiment of the present disclosure.

Referring to FIG. 3, an embodiment of the present disclosure provides a method for determining a packet forwarding path. In the method, in addition to generating a first packet forwarding path as a primary path for forwarding a packet, a first network node further generates a second packet forwarding path. The second packet forwarding path is an FRR backup path. After receiving the packet, if determining that a second network node is unreachable through the first packet forwarding path, the first network node sends the packet through the second packet forwarding path, to implement a fast rerouting function. The method includes the following steps.

S301. The first network node obtains a first segment identifier advertisement message, where the first segment identifier advertisement message includes a first segment identifier and a first flag bit, and the first segment identifier is corresponding to the second network node.

S302. The first network node determines that the first flag bit indicates that the packet needs to be forwarded through the second network node.

S303. The first network node generates the first packet forwarding path, where the first packet forwarding path includes the second network node.

Steps S301 to S303 are similar to steps S201 to S203 in the example shown in FIG. 2, and details are not described herein again.

S304. The first network node generates the second packet forwarding path, where the second packet forwarding path includes the second network node, the first packet forwarding path is different from the second packet forwarding path, the first packet forwarding path is the primary path, and the second packet forwarding path is a backup path of the first packet forwarding path.

In an example, the first network node is a network ingress node. Referring to the application scenario shown in FIG. 1, the first network node is the network ingress node 100, and the second network node is the network node 103. The first network node 100 obtains the first segment identifier advertisement message. The first segment identifier advertisement message includes the first segment identifier and the first flag bit, and the first segment identifier is corresponding to the network node 103. The network node 100 determines that the first flag bit indicates that the packet needs to be forwarded through the network node 103. The network node 100 generates the first packet forwarding path including the network node 103. For example, for a first packet whose destination address is the node 105, a segment list of the first packet forwarding path is [1001, 1003, 1004, 1005], and includes the network node 103. The network node 100 further generates the second packet forwarding path including the network node 103. For example, for a first packet whose destination address is the network node 105, a segment list of the second packet forwarding path is [1001, 1002, 2023, 1004, 1005]. In other words, the packet reaches the network node 102 through the network node 101, reaches the network node 103 through the link between the network node 102 and the network node 103, and then reaches the network node 105 through the network node 104. In addition, the first packet forwarding path is used as the primary path for forwarding a packet, and the second packet forwarding path is used as the FRR backup path when the primary path is faulty. For example, when the link between the network node 101 and the network node 103 is faulty, that is, when the primary path is faulty, the packet may still be forwarded through the backup path.

In an example, the first network node is a network intermediate node. The first network node receives a first packet that includes a segment list. A topmost segment identifier in the segment list is a segment identifier corresponding to the primary path. The first network node determines that the second network node is unreachable through the primary path, replaces the segment identifier that is corresponding to the primary path and that is in the segment list with a segment identifier corresponding to the backup path, to generate a second packet, and sends the second packet to the second network node. Referring to the application scenario shown in FIG. 1, the first network node may be an intermediate node 101, and the second network node is the network node 103. The first network node 101 obtains the first segment identifier advertisement message. The first segment identifier advertisement message includes the first segment identifier and the first flag bit, and the first segment identifier is corresponding to the network node 103. The first segment identifier may be the node segment identifier 1003 of the network node 103. That the first network node 101 obtains the first segment identifier advertisement message means that the network node 101 receives the first segment identifier advertisement message sent by the network node 103. The first segment identifier advertisement message is generated by the network node 103. Alternatively, the first segment identifier may be the adjacent segment identifier 2013 of the link used by the network node 101 to connect to the network node 103. That the first network node 101 obtains the first segment identifier advertisement message means that the network node 101 generates the first segment identifier advertisement message.

The network node 101 determines that the first flag bit indicates that the packet needs to be forwarded through the network node 103, and the network node 101 generates the first packet forwarding path. The first forwarding path is a path to the network node 103. A segment list corresponding to the first packet forwarding path may be [2013], and includes the network node 103. The network node 101 further generates the second packet forwarding path. The second packet forwarding path is also a path to the network node 103. A segment list corresponding to the second packet forwarding path is [1002, 2023]. The second packet forwarding path is from the network node 101 to the network node 102, and then from the link between the network node 102 and the network node 103 to the network node 103. The second packet forwarding path still includes the network node 103. In addition, the first packet forwarding path is used as the primary path for forwarding a packet, and the second packet forwarding path is used as the FRR backup path when the primary path is faulty. For example, when the link between the network node 101 and the network node 103 is faulty, that is, when the primary path is faulty, the packet may still be forwarded through the backup path.

The network node 101 receives a first packet that includes a segment list. A topmost segment identifier in the segment list is a segment identifier corresponding to the primary path, namely, [1003]. When determining that the network node 103 is unreachable through the primary path, the network node 101 replaces the segment identifier corresponding to the primary path in the segment list with a segment identifier corresponding to the backup path. The network node 101 replaces the topmost segment identifier [1003] in the segment list of the first packet with [1002, 2023], and generates a second packet. The network node 101 forwards the second packet to the network node 103.

Based on the FRR backup path, when the primary path is faulty, the packet is switched to the backup path for forwarding, thereby improving network reliability. In addition, both the primary path and the backup path include the second network node, namely, a key node in a network, and network security is also considered. This ensures that the packet forwarded by using an FRR policy still passes through the key node in the network.

In an example, the first network node generates a forwarding entry. The forwarding entry includes a segment list and an outbound interface that are corresponding to the primary path, and a segment list and an outbound interface that are corresponding to the backup path. For example, the first network node is the network node 101 in FIG. 1, and the network node 101 generates the forwarding entry. A next-hop node corresponding to the forwarding entry is the second network node, namely, the network node 103. The forwarding entry includes a segment list [2013] corresponding to the primary path, where an outbound interface of the segment list [2013] is an interface 1, and a segment list [1002, 2023] corresponding to a backup path, where an outbound interface of the segment list [1002, 2023] is an interface 2. A form of the forwarding entry may be shown in Table 2. The forwarding entry may be stored in the first network node.

TABLE 2

Forwarding entry generated by the network node 101

| Network node 103 | Segment list | Outbound interface |
| --- | --- | --- |
| Primary path | [2013] | Interface 1 |
| Backup path | [1002, 2023] | Interface 2 |

Figure 4:
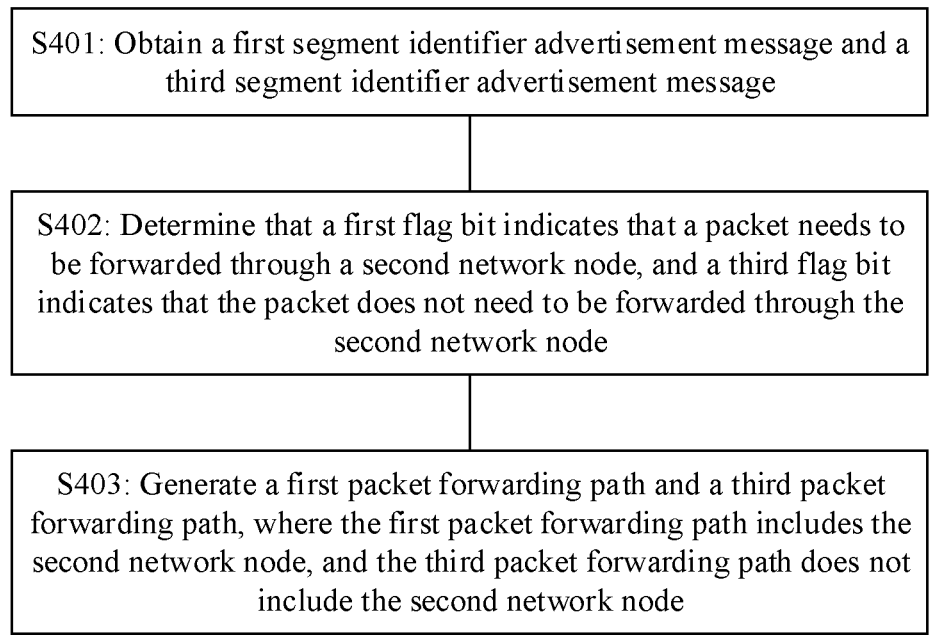
FIG. 4 is a schematic flowchart of a method for determining a packet forwarding path according to an embodiment of the present disclosure.

Referring to FIG. 4, an embodiment of the present disclosure provides a method for determining a packet forwarding path. In the method, a segment identifier advertisement message may include two types. A flag bit in one type of segment identifier advertisement message indicates that a packet needs to be forwarded through a second network node, and a flag bit in the other type of segment identifier advertisement message indicates that the packet does not need to be forwarded through the second network node. A first network node obtains the two types of segment identifier advertisement messages, and may generate two types of packet forwarding paths for different types of packets based on indications of different flag bits. One type of packet forwarding path includes the second network node, and the other type of packet forwarding path does not include the second network node. The method includes the following steps.

S401. The first network node obtains a first segment identifier advertisement message and a third segment identifier advertisement message, where the first segment identifier advertisement message includes a first segment identifier and a first flag bit, the first segment identifier is corresponding to the second network node, the third segment identifier advertisement message includes a third segment identifier and a third flag bit, and the third segment identifier is corresponding to the second network node.

S402. The first network node determines that the first flag bit indicates that the packet needs to be forwarded through the second network node, and the first network node determines that the third flag bit indicates that the packet does not need to be forwarded through the second network node.

S403. The first network node receives a first packet; when determining that the first packet is a first-type packet, the first network node generates a first packet forwarding path, where the first packet forwarding path includes the second network node; and when determining that the first packet is a second-type packet, the first network node generates a third packet forwarding path, where the third packet forwarding path does not include the second network node.

In an example, the first network node may be a network ingress node. When receiving a packet, the network ingress node generates different packet forwarding paths based on different packet types, so that some types of packets are forwarded through a network key node, and some other types of packets are not forwarded through the network key node. Referring to the application scenario shown in FIG. 1, the first network node may be the network ingress node 100, and the second network node may be the network node 103. The network node 103 has two node segment identifiers, 1003 and 10032. The first segment identifier may be the node segment identifier 1003 of the node 103, and the third segment identifier may be a node segment identifier 10032 of the network node 103. The node 103 generates two segment identifier advertisement messages: the first segment identifier advertisement message and the third segment identifier advertisement message. The first segment identifier advertisement message includes the first segment identifier 1003 and the first flag bit, and the first flag bit indicates that the packet needs to be forwarded through the network node 103. The third segment identifier advertisement message includes the third segment identifier 10032 and the third flag bit, and the third flag bit indicates that the packet does not need to be forwarded through the network node 103. After generating the foregoing two segment identifier advertisement messages, the network node 103 sends the two segment identifier advertisement messages to the network node 100. The network node 100 receives the first segment identifier advertisement message and the third segment identifier advertisement message, and determines that the first flag bit indicates that the packet needs to be forwarded through the network node 103, and the third flag bit indicates that the packet does not need to be forwarded through the network node 103.

The network ingress node 100 receives the first packet, and when determining that the first packet is the first-type packet, generates the first packet forwarding path for forwarding the first packet. For example, for a packet whose destination address is the network node 105, the first packet forwarding path may be that the packet reaches the network node 105 through the network node 101, the network node 103, and the network node 104, and the first packet forwarding path includes the network node 103. In other words, the first-type packet is forwarded through the firewall node. When determining that the first packet is the second-type packet, the network ingress node 100 generates the third packet forwarding path for forwarding the first packet. For example, for a packet whose destination address is the network node 105, the third packet forwarding path may be that the packet reaches the network node 105 through the network node 101, the network node 102, and the network node 104, and the third packet forwarding path does not include the network node 103. In other words, the second-type packet is not forwarded through the firewall node.

In an example, the first network node may also be a network intermediate node. The network intermediate node may generate different backup paths based on different packet types. Therefore, when a primary path is unreachable, FRR forwarding of some types of packets passes through the network key node, and FRR forwarding of other types of packets does not pass through the network key node. Referring to the application scenario shown in FIG. 1, the first network node may be a network intermediate node 101, and the second network node may be the network node 103. The network node 103 has two node segment identifiers, 1003 and 10032. The first segment identifier may be the node segment identifier 1003 of the node 103, and the third segment identifier may be a node segment identifier 10032 of the node 103. The network node 103 generates two segment identifier advertisement messages, the first segment identifier advertisement message and the third segment identifier advertisement message. The first segment identifier advertisement message includes the first segment identifier 1003 and the first flag bit, and the first flag bit indicates that the packet needs to be forwarded through the network node 103. The third segment identifier advertisement message includes the third segment identifier 10032 and the third flag bit, and the third flag bit indicates that the packet does not need to be forwarded through the network node 103.

In an example, the network node 101 receives the first segment identifier advertisement message and the third segment identifier advertisement message, and determines that the first flag bit indicates that the packet needs to be forwarded through the network node 103, and the third flag bit indicates that the packet does not need to be forwarded through the network node 103. The network node 101 generates the first packet forwarding path as the primary path for forwarding the packet. A segment list corresponding to the first packet forwarding path is [2013], and the first packet forwarding path includes the network node 103. The network node 101 further generates a second packet forwarding path. A segment list corresponding to the second packet forwarding path is [1002, 2023], that is, from the network node 101 to the network node 102, and then from the network node 102 to the network node 103. The second packet forwarding path still includes the network node 103. The network node 101 further generates the third packet forwarding path. The third packet forwarding path may be [1002, 1004], that is, from the network node 101 to the network node 102, and then from the network node 102 to the network node 104. Both the second packet forwarding path and the third packet forwarding path are used as FRR backup paths when the primary path is faulty. The network node 101 receives the first packet that includes a segment list. A topmost segment identifier in the segment list is a segment identifier corresponding to the primary path, namely, [2013]. The network node 101 determines that the node 103 is unreachable through the primary path, determines that the first packet is the first-type packet, and replaces the segment identifier corresponding to the primary path in the segment list with a segment identifier corresponding to the second packet forwarding path. That is, the network node 101 replaces the topmost segment identifier [2013] in the segment list with [1002, 2023]. A replaced packet is a second packet, and then the network node 101 forwards the second packet to the network node 103, that is, an FRR path still passes through the network node 103. The network node 101 further receives a third packet that includes a segment list. A topmost segment identifier in the segment list is a segment identifier corresponding to the primary path, namely, [1003]. The network node 101 determines that the network node 103 is unreachable through the primary path, determines that the third packet is the second-type packet, and replaces the segment identifier corresponding to the primary path in the segment list with a segment identifier corresponding to the third packet forwarding path. The network node 101 replaces the topmost segment identifier [2013] in the segment list with [1002, 1004]. A replaced packet is a fourth packet, and then the network node 101 continues to forward the fourth packet, that is, the FRR path no longer passes through the network node 103.

Packet types may be classified based on security requirements. The first-type packet is a packet with a high security requirement, for example, financial data. The second-type packet is a packet with a low security requirement, for example, live video streaming data. Some packets have a relatively high security requirement. For example, if the financial data is forwarded without passing through the firewall node, a network security risk is caused. Therefore, as described above, the first-type packet may be forced to be forwarded through the firewall node with reference to the indication of the first flag bit, to protect network security. If the firewall node is faulty, packet discarding processing is performed on the first-type packet. However, some other packets have a relatively low security requirement. For example, for the live video streaming data, even if the firewall node is faulty, a user still expects that live video streaming is not affected. Therefore, for the second-type packet, as described above, a forwarding path that does not include the firewall node may be generated at the network ingress node with reference to the indication of the third flag bit, or a backup path that does not include the firewall node is generated at the network intermediate node, to ensure that the live video streaming is not interrupted when the firewall node is faulty.

An embodiment of the present disclosure provides a method for determining a packet forwarding path. The method includes one type of segment identifier advertisement message, and a flag bit in the segment identifier advertisement message indicates that a packet does not need to be forwarded through a second network node. A first network node obtains the segment identifier advertisement message. A generated packet forwarding path does not include the second network node based on an indication of the flag bit.

In an example, the first network node may be a network ingress node. Referring to the application scenario shown in FIG. 1, the first network node may be the network ingress node 100, and the second network node may be the network node 103. The network node 103 generates a first segment identifier advertisement message. The first segment identifier advertisement message includes the first segment identifier 1003 and a first flag bit, and the first segment identifier 1003 is the node segment identifier of the network node 103. The network node 100 obtains the first segment identifier advertisement message. The network node 100 determines that the first flag bit indicates that the packet does not need to be forwarded through the network node 103. The network node 100 generates a first packet forwarding path that does not include the network node 103. For example, for a first packet whose destination address is the network node 105, the first packet forwarding path passes through the network node 101, the network node 102, and the network node 104, and reaches the network node 105, where the network node 103 is not included.

In an example, the first network node may be a network intermediate node. Referring to the application scenario shown in FIG. 1, the first network node may be the network intermediate node 101, and the second network node may be the network node 103. The network node 103 generates a first segment identifier advertisement message. The first segment identifier advertisement message includes the first segment identifier 1003 and a first flag bit, and the first segment identifier 1003 is the node segment identifier of the network node 103. The network node 101 obtains the first segment identifier advertisement message. The network node 101 determines that the first flag bit indicates that the packet does not need to be forwarded through the network node 103. The network node 101 generates the first packet forwarding path that does not include the network node 103. It should be noted that, as the network intermediate node, the first packet forwarding path generated by the network node 101 is a segment of an intermediate path to a next hop, and is used as a part of a complete packet forwarding path for forwarding a packet. The first packet forwarding path may be the link between the network node 101 and the network node 102, namely, [2012], and does not include the network node 103.

Figure 5:
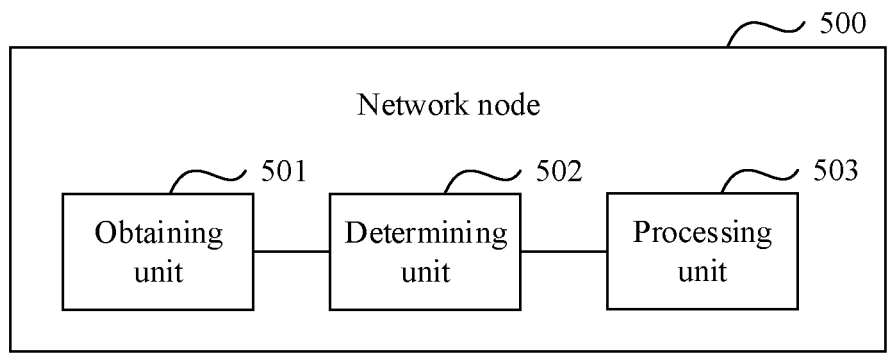
FIG. 5 is a schematic structural diagram of a network node according to an embodiment of the present disclosure.

FIG. 5 is a possible schematic structural diagram of the first network node in the foregoing embodiments. The network node 500 may implement functions of the first network node in the embodiments shown in FIG. 2 to FIG. 4. Referring to FIG. 5, the network node 500 includes an obtaining unit 501, a determining unit 502, and a processing unit 503. These units may perform the corresponding functions of the first network node in the foregoing method examples. For example, the obtaining unit 501 is configured to perform segment identifier advertisement message obtaining performed by the first network node in the foregoing method embodiments. The determining unit 502 is configured to perform flag bit determining performed by the first network node in the foregoing method embodiments. The processing unit 503 is configured to perform path generation performed by the first network node in the foregoing method embodiments. For example, the obtaining unit 501 is configured to obtain a first segment identifier advertisement message. The determining unit 502 is configured to determine that a first flag bit indicates that a packet needs to be forwarded through a second network node. The processing unit 503 is configured to generate a first packet forwarding path. The first packet forwarding path includes the second network node.

In an example, the network node 500 further includes a generation unit and a sending unit. These units may perform corresponding functions of the first network node in the foregoing method example. For example, the generation unit is configured to perform segment identifier advertisement message generation performed by the first network node in the foregoing method embodiments. The sending unit is configured to perform segment identifier advertisement message sending performed by the first network node in the foregoing method embodiments. For example, the generation unit is configured to generate the first segment identifier advertisement message. The sending unit is configured to send the first segment identifier advertisement message to another network node in a network.

Figure 6:
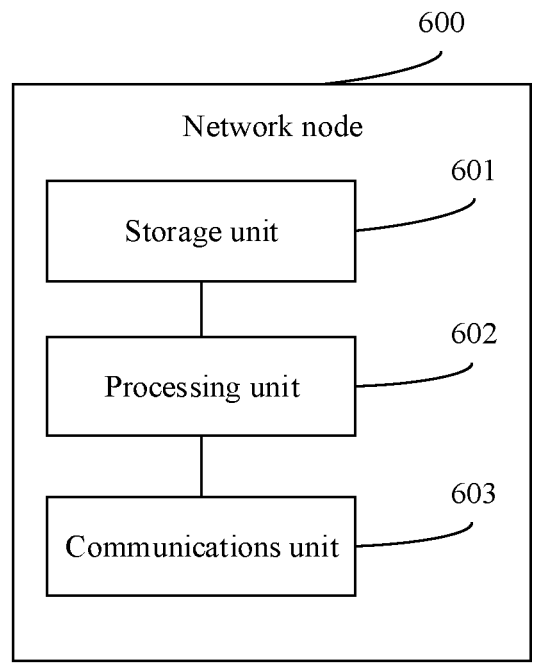
FIG. 6 is a schematic structural diagram of a network node according to an embodiment of the present disclosure.

When an integrated unit is used, FIG. 6 is another possible schematic structural diagram of the first network node in the foregoing embodiments. The network node 600 may also implement the functions of the first network node in the embodiments shown in FIG. 2 to FIG. 4.

The network node 600 includes a storage unit 601, a processing unit 602, and a communications unit 603. The processing unit 602 is configured to control and manage an action of the first network node 600. For example, the processing unit 602 is configured to support the network node 600 in performing the processes S201, S202, and S203 in FIG. 2, the processes S301, S302, S303 and S304 in FIG. 3, the processes S401, S402, and S403 in FIG. 4, and/or another process of the technology described in this specification. The communications unit 603 is configured to support communication between the network node 600 and another network entity, for example, communication between the network node 600 and a second network node. The storage unit 601 is configured to store program code and data of the network node 600.

In an example, the processing unit 602 is further configured to support the network node 600 in performing segment identifier advertisement message generation, segment identifier advertisement message sending, and/or another process used for the technology described in this specification. The communications unit 603 is configured to support the network node 600 in communicating with another network entity, for example, communicating with another network node in a network.

The processing unit 602 may be a processor, for example, a central processing unit (CPU), a general-purpose processor, a digital signal processor (DSP), an application-specific integrated circuit (ASIC), a field programmable gate array (FPGA), or another programmable logic device, a transistor logic device, a hardware component, or any combination thereof. The processing unit 602 may implement or execute various example logical blocks, modules, and circuits described with reference to content disclosed in the embodiments of the present disclosure. The processor may be a combination of processors implementing a computing function, for example, a combination of one or more microprocessors, or a combination of the DSP and a microprocessor. The communications unit 603 may be a transceiver, and the storage unit 601 may be a memory.

Figure 7:
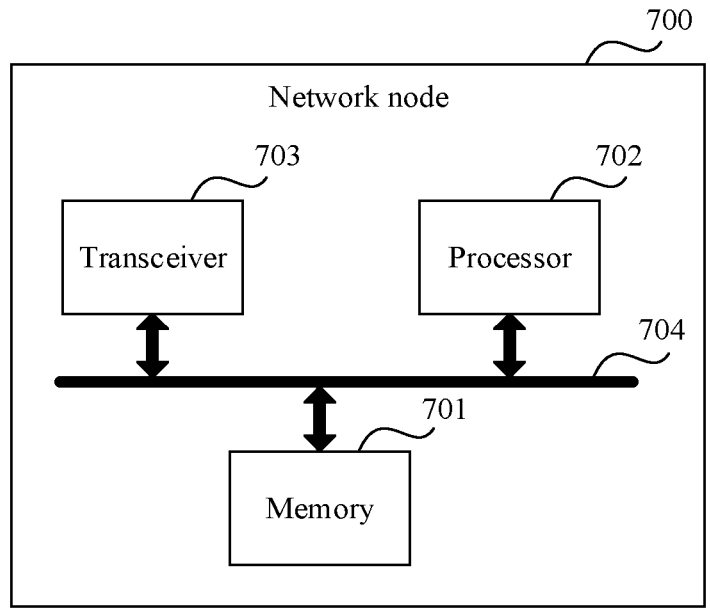
FIG. 7 is a schematic structural diagram of a network node according to an embodiment of the present disclosure.

When the processing unit 602 is the processor, the communications unit 603 is the transceiver, and the storage unit 601 is the memory, the first network unit in the embodiments of the present disclosure may be a network node 700 shown in FIG. 7.

FIG. 7 is another possible schematic structural diagram of the first network node in the foregoing embodiments. The network node 700 includes a processor 702, a transceiver 703, a memory 701, and a bus 704. The transceiver 703, the processor 702, and the memory 701 are interconnected through the bus 704. The bus 704 may be a peripheral component interconnect (PCI) bus, an Extended Industry Standard Architecture (EISA) bus, or the like. The bus may be classified into an address bus, a data bus, a control bus, and the like. For ease of representation, only one thick line is used to represent the bus in FIG. 7, but this does not mean that there is only one bus or only one type of bus.

Figure 8:
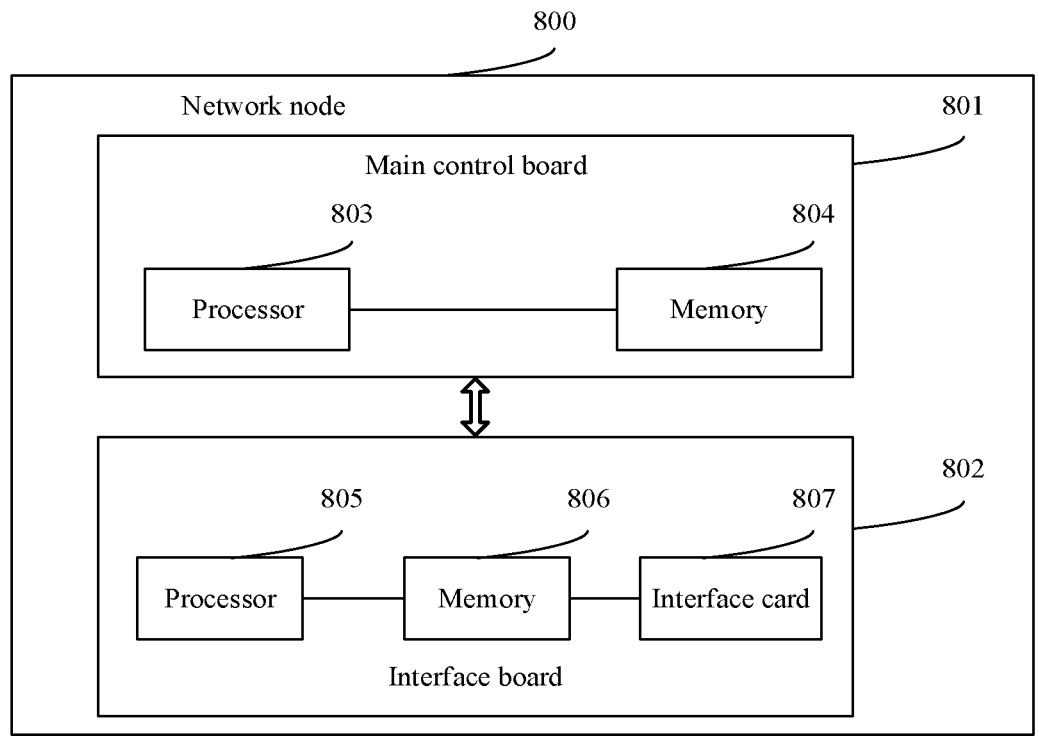
FIG. 8 is a schematic structural diagram of a network node according to an embodiment of the present disclosure.

FIG. 8 is another possible schematic structural diagram of the first network node in the foregoing embodiments. The network node 800 includes a main control board 801 and an interface board 802. The main control board 801 includes a processor 803 and a memory 804. The interface board includes a processor 805, a memory 806, and an interface card 807. The main control board 801 and the interface board 802 are coupled.

These hardware devices may implement corresponding functions of the first network node in the method examples in FIG. 2 to FIG. 4. For example, the memory 806 is configured to store program code of the interface board 802, the processor 805 is configured to invoke the program code in the memory 806 to trigger the interface card 807 to perform various information receiving and sending performed by the first network node in the foregoing method embodiments. The memory 804 may be configured to store program code of the main control board 801, and the processor 803 is configured to invoke the program code in the memory 804 to perform other processing other than information receiving and sending performed by the first network node in the foregoing method embodiments.

For example, the processor 805 is configured to trigger the interface card 807 to perform receiving. The processor 803 is configured to determine that a first flag bit indicates that a packet needs to be forwarded through a second network node, and generate a first packet forwarding path. The memory 804 is configured to store the program code and data of the main control board 801, and the memory 806 is configured to store the program code and data of the interface board 802.

In an example, the processor 803 is further configured to generate a first segment identifier advertisement message, and the processor 805 is further configured to send the first segment identifier advertisement message.

In a possible implementation, an IPC channel is established between the main control board 801 and the interface board 802, and communication is performed between the main control board 801 and the interface board 802 through the IPC channel. For example, the main control board 801 receives the first segment identifier advertisement message from the interface board 802 through the IPC channel.

The network node 800 may be a router, a switch, or a network node having a forwarding function. The network node 800 can implement the functions of the first network node in the foregoing method embodiments. For execution steps, refer to the foregoing method embodiments, and details are not described herein again.

Figure 9:
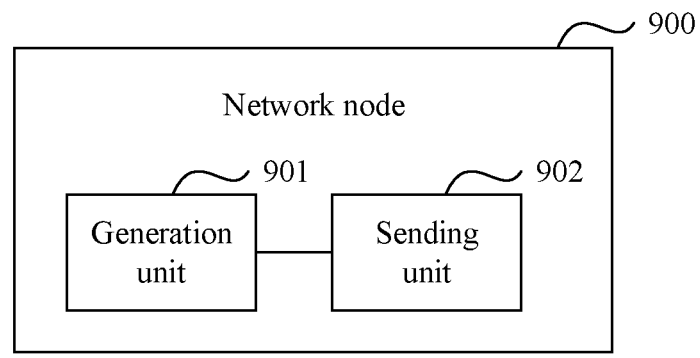
FIG. 9 is a schematic structural diagram of a network node according to an embodiment of the present disclosure.

FIG. 9 is a possible schematic structural diagram of the second network node in the foregoing embodiments. The network node 900 may implement functions of the second network node in the foregoing embodiments. Referring to FIG. 9, the network node 900 includes a generation unit 901 and a sending unit 902. These units may perform corresponding functions of the second network node in the foregoing method example. For example, the generation unit 901 is configured to perform segment identifier advertisement message generation performed by the second network node in the foregoing method embodiments. The sending unit 902 is configured to perform segment identifier advertisement message sending performed by the second network node in the foregoing method embodiments. For example, the generation unit 901 is configured to generate a first segment identifier advertisement message. The sending unit 902 is configured to send the first segment identifier advertisement message to a first network node.

Figure 10:
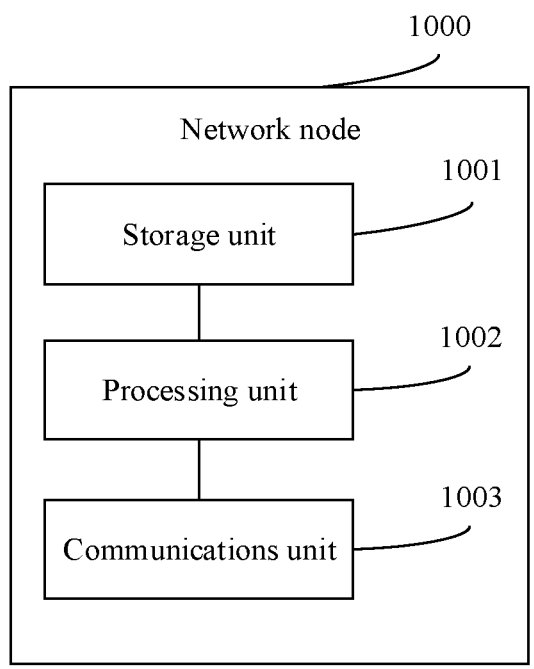
FIG. 10 is a schematic structural diagram of a network node according to an embodiment of the present disclosure.

When an integrated unit is used, FIG. 10 is another possible schematic structural diagram of the second network node in the foregoing embodiments. The second network node may also implement the functions of the second network node in the foregoing embodiments.

The network node 1000 includes a storage unit 1001, a processing unit 1002, and a communications unit 1003. The processing unit 1002 is configured to control and manage an action of the second network node 1000. For example, the processing unit 1002 is configured to support the network node 1000 in segment identifier advertisement message generation, segment identifier advertisement message sending, and/or another process used for the technology described in this specification. The communications unit 1003 is configured to support communication between the network node 1000 and another network entity, for example, communication between the network node 1000 and a first network node. The storage unit 1001 is configured to store program code and data of the network node 1000.

The processing unit 1002 may be a processor, for example, may be a CPU, a general purpose processor, a DSP, an ASIC, an FPGA, or another programmable logic device, a transistor logic device, a hardware component, or any combination thereof. The processing unit 1002 may implement or execute various example logical blocks, modules, and circuits described with reference to content disclosed in the embodiments of the present disclosure. The processor may be a combination of processors implementing a computing function, for example, a combination of one or more microprocessors, or a combination of the DSP and a microprocessor. The communications unit 1003 may be a transceiver. The storage unit 1001 may be a memory.

Figure 11:
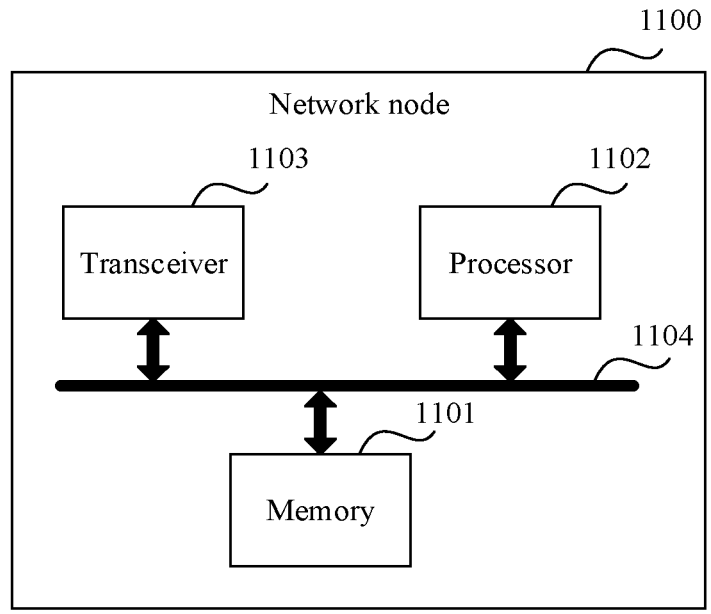
FIG. 11 is a schematic structural diagram of a network node according to an embodiment of the present disclosure.

When the processing unit 1002 is the processor, the communications unit 1003 is the transceiver, and the storage unit 1001 is the memory, the second network node in the embodiments of the present disclosure may be a network node 1100 shown in FIG. 11.

FIG. 11 is a possible schematic structural diagram of the second network node in the foregoing embodiments. The network node 1100 includes a processor 1102, a transceiver 1103, a memory 1101, and a bus 1104. The transceiver 1103, the processor 1102, and the memory 1101 are connected to each other through the bus 1104. The bus 1104 may be a PCI bus, an EISA bus, or the like. The bus may be classified into an address bus, a data bus, a control bus, and the like. For ease of representation, only one thick line is used to represent the bus in FIG. 11, but this does not mean that there is only one bus or only one type of bus.

Figure 12:
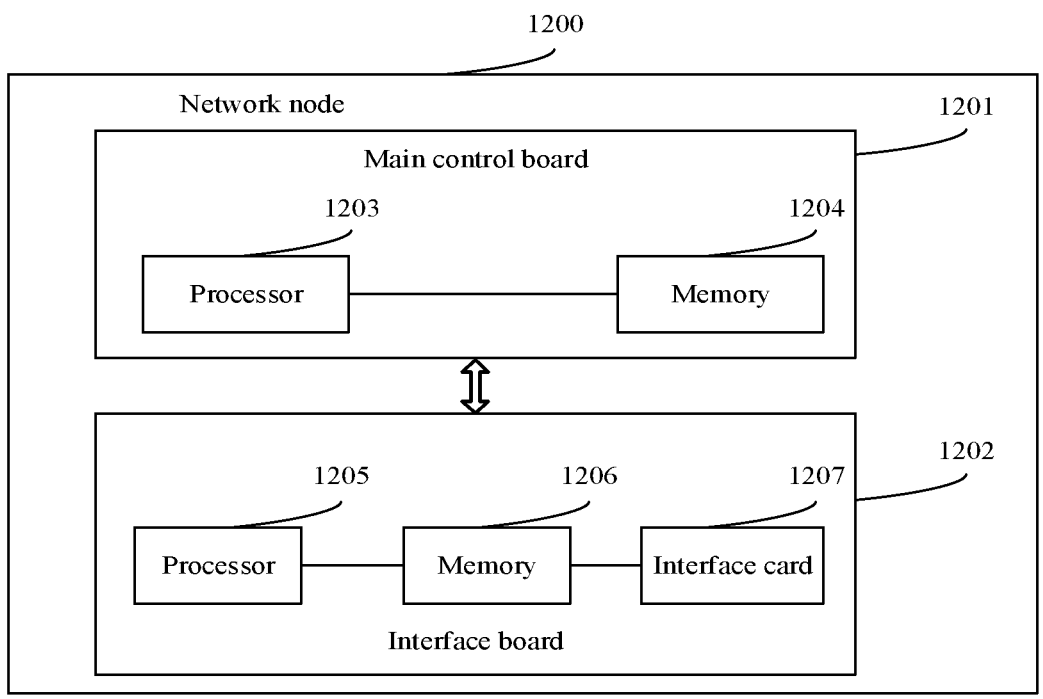
FIG. 12 is a schematic structural diagram of a network node according to an embodiment of the present disclosure.

FIG. 12 is a possible schematic structural diagram of the second network node in the foregoing embodiments. The second network node 1200 includes a main control board 1201 and an interface board 1202. The main control board 1201 includes a processor 1203 and a memory 1204. The interface board 1202 includes a processor 1205, a memory 1206, and an interface card 1207. The main control board 1601 and the interface board 1602 are coupled.

These hardware devices may implement corresponding functions of the second network node in the foregoing embodiments. For example, the memory 1206 is configured to store program code of the interface board 1202, the processor 1205 is configured to invoke the program code in the memory 1206 to trigger the interface card 1207 to perform various information receiving and sending performed by the second network node in the foregoing method embodiments. The memory 1204 may be configured to store program code of the main control board 1201, and the processor 1203 is configured to invoke the program code in the memory 1204 to perform other processing other than information receiving and sending performed by the second network node in the foregoing method embodiments. For example, the processor 1203 is configured to generate a first segment identifier advertisement message, and the processor 1205 is configured to trigger the interface card 1207 to send the first segment identifier advertisement message to a first network node.

In a possible implementation, an IPC channel is established between the main control board 1201 and the interface board 1202, and communication is performed between the main control board 1201 and the interface board 1202 through the IPC channel.

The network node 1200 may be a router, a switch, or a network node having a forwarding function. The network node 1200 can implement functions of a corresponding network node in the foregoing method embodiments. For execution steps, refer to the foregoing method embodiments, and details are not described herein again.

Figure 13:
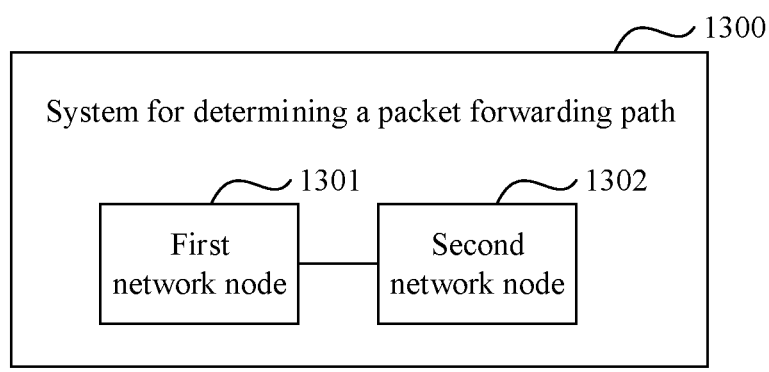
FIG. 13 is a schematic diagram of a system for determining a packet forwarding path according to an embodiment of the present disclosure.

Referring to FIG. 13, an embodiment of the present disclosure provides another system 1300 for determining a packet forwarding path. The system 1300 is configured to implement the method for determining a packet forwarding path in the foregoing method embodiments. The system 1300 includes a first network node 1301 and a second network node 1302. The first network node 1301 and the second network node 1302 may respectively implement functions of the first network node and the second network node in the foregoing embodiments. For example, the first network node 1301 performs the processes S201, S202, and S203 in FIG. 2, the processes S301, S302, S303 and S304 in FIG. 3, the processes S401, S402, and S403 in FIG. 4, and/or another process used for the technology described in this specification. The second network node performs segment identifier advertisement message generation, segment identifier advertisement message sending, and/or another process used for the technology described in this specification.

An embodiment of the present disclosure further provides a non-volatile storage medium configured to store a software instruction used in the foregoing embodiments. The non-volatile storage medium includes a program used to perform the methods shown in the foregoing embodiments. When the program is executed on a computer or a network node, the computer or the network node is enabled to perform the methods in the foregoing method embodiments.

An embodiment of the present disclosure further provides a computer program product including a computer program instruction. When the computer program product is run on a network node, the network node is enabled to perform the methods in the foregoing method embodiments.

"First" in the first network node in the embodiments of the present disclosure is merely used as a name identifier, and does not represent a first place in sequence. For the words "second" and "third", this rule also applies.

It should be noted that any apparatus embodiment described above is merely an example. The units described as separate parts may or may not be physically separate, and parts displayed as units may or may not be physical units, may be located in one position, or may be distributed on a plurality of network units. Some or all the modules may be selected to achieve the objectives of the solutions of the embodiments. In addition, in the accompanying drawings of the network node embodiments provided by the present disclosure connection relationships between modules indicate that the modules have communication connections with each other, which may be implemented as one or more communications buses or signal cables. A person of ordinary skill in the art may understand and implement the embodiments of the present disclosure without creative efforts.

Methods or algorithm steps described in combination with the content disclosed in the embodiments of the present disclosure may be implemented by hardware, or may be implemented by a processor by executing a software instruction. The software instruction may include a corresponding software module. The software module may be stored in a random-access memory (RAM), a flash memory, a read-only memory (ROM), an erasable programmable read-only memory (EPROM), an electrically erasable programmable read-only memory (EEPROM), a hard disk, a removable hard disk, a compact disc, or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a network node. Certainly, the processor and the storage medium may exist in the network node as discrete components.

A person skilled in the art should be aware that in the foregoing one or more examples, functions described in the embodiments of the present disclosure may be implemented by hardware, software, firmware, or any combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or a special-purpose computer.

The objectives, technical solutions, and benefits of the present disclosure are further described in detail in the foregoing embodiments. It should be understood that the foregoing descriptions are not intended to limit the protection scope of the present disclosure. Any modification, equivalent replacement, or improvement made within the spirit and principle of the present disclosure shall fall within the protection scope of the present disclosure.

What is claimed is:

1. A first network node comprising:
one or more processors; and
a memory coupled to the one or more processors and configured to store instructions which, when executed by the one or more processors, cause the first network node to:
obtain a first segment identifier advertisement message comprising a first segment identifier and a first flag bit, wherein the first segment identifier corresponds to a second network node;
determine the first flag bit indicates a packet needs to be forwarded through the second network node;
obtain a first packet forwarding path comprising the second network node, wherein the first packet forwarding path is a primary path;
obtain a second packet forwarding path comprising the second network node, wherein the first packet forwarding path is different from the second packet forwarding path, and wherein the second packet forwarding path is a first backup path of the first packet forwarding path;
receive a first packet comprising a first segment list, wherein a first topmost segment identifier in the first segment list is a second segment identifier corresponding to the primary path;
determine the second network node is unreachable through the primary path;
replace the first topmost segment identifier with a third segment identifier corresponding to the first backup path to generate a second packet; and
send the second packet to the second network node.

2. The first network node of claim 1, wherein the instructions further cause the first network node to generate a forwarding entry comprising the second segment identifier and the third segment identifier.

3. The first network node of claim 1, wherein the instructions further cause the first network node to:
obtain a second segment identifier advertisement message comprising a fourth segment identifier and a second flag bit, wherein the fourth segment identifier corresponds to the second network node;
determine the second flag bit indicates the packet does not need to be forwarded through the second network node; and
obtain a third packet forwarding path not comprising the second network node, wherein the third packet forwarding path is a second backup path of the first packet forwarding path.

4. The first network node of claim 1, wherein the first segment identifier is a node segment identifier of the second network node, or the first segment identifier is an adjacent segment identifier of a link of the first network node, and wherein the first network node is connected to the second network node through the link.

5. The first network node of claim 4, wherein when the first segment identifier is the adjacent segment identifier, the instructions further cause the first network node to:
receive, from a controller, a control message indicating that the packet needs to be forwarded through the second network node;
generate the first segment identifier advertisement message; and
send the first segment identifier advertisement message to another node in a network.

6. The first network node of claim 4, wherein when the first segment identifier is the adjacent segment identifier, the instructions further cause the first network node to:
- receive a second segment identifier advertisement message comprising a second segment identifier and a second flag bit, wherein the second segment identifier is the node segment identifier of the second network node;
- determine the second flag bit indicates the packet needs to be forwarded through the second network node;
- generate the first segment identifier advertisement message; and
- send the first segment identifier advertisement message to another node in a network.

7. The first network node of claim 1, wherein the instructions further cause the first network node to:
- before the first network node obtains the first packet forwarding path:
  - receive a first packet; and
  - determine the first packet is a first-type packet; and
- after the first network node obtains the first packet forwarding path:
  - determine a segment list corresponding to the first packet forwarding path;
  - push the segment list into the first packet, to generate a second packet; and
  - forward the second packet based on the segment list.

8. The first network node of claim 7, wherein a priority of the first-type packet is higher than a first threshold, or a security requirement level of the first-type packet is higher than a first threshold.

9. The first network node of claim 1, wherein the instructions further cause the first network node to:
- obtain a third segment identifier advertisement message comprising a third segment identifier and a third flag bit, wherein the third segment identifier corresponds to the second network node;
- determine the third flag bit indicates the packet does not need to be forwarded through the second network node;
- receive a third packet;
- determine the third packet is a second-type packet;
- obtain a third packet forwarding path not comprising the second network node;
- determine a segment list corresponding to the third packet forwarding path;
- push the segment list into the third packet to generate a fourth packet; and
- forward the fourth packet based on the segment list.

10. The first network node of claim 9, wherein a priority of the second-type packet is lower than a second threshold, or a security requirement level of the second-type packet is lower than a second threshold.

11. The first network node of claim 3, wherein the instructions further cause the first network node to:
- receive a third packet comprising a second segment list, wherein a second topmost segment identifier in the second segment list is the second segment identifier;
- determine the second packet is a first-type packet;
- determine the second network node is unreachable through the primary path;
- replace the second segment identifier with a third segment identifier corresponding to the first backup path, to generate a fourth packet; and
- send the fourth packet to the second network node.

12. The first network node of claim 11, wherein a priority of the first-type packet is higher than a first threshold, and wherein a security requirement level of the first-type packet is higher than a first threshold.

13. The first network node of claim 3, wherein the instructions further cause the first network node to:
- receive a third packet comprising the first segment list;
- determine the third packet is a second-type packet;
- determine the second network node is unreachable through the primary path;
- replace the second segment identifier with the third segment identifier, to generate a fourth packet; and
- forward the fourth packet.

14. The first network node of claim 13, wherein a priority of the second-type packet is lower than a second threshold, or a security requirement level of the second-type packet is lower than a second threshold.

15. A second network node comprising:
- one or more processors; and
- a memory coupled to the one or more processors and configured to store instructions which, when executed by the one or more processors, cause the second network node to:
  - generate a first segment identifier advertisement message comprising a first segment identifier and a first flag bit indicating packet forwarding paths need to pass through a network node corresponding to the first segment identifier;
  - send the first segment identifier advertisement message to a first network node, wherein the first flag bit indicates that a first packet forwarding path obtained by the first network node passes through the network node corresponding to the first segment identifier;
  - generate a third segment identifier advertisement message comprising a third segment identifier and a third flag bit indicating packet forwarding paths do not need to pass through a network node corresponding to the third segment identifier, wherein the network node corresponding to the third segment identifier is a same node as the network node corresponding to the first segment identifier, wherein the third flag bit indicates that a third packet forwarding path obtained by the first network node does not pass through the network node corresponding to the first segment identifier; and
  - send the third segment identifier advertisement message to the first network node.

16. The second network node of claim 15, wherein the first segment identifier is a node segment identifier of the second network node, or the first segment identifier is an adjacent segment identifier of a link of the second network node, wherein the second network node is connected to a third network node through the link, and wherein the third network node is the network node corresponding to the first segment identifier.

17. The second network node of claim 16, wherein when the first segment identifier is the adjacent segment identifier, the instructions further cause the second network node to receive, from a controller, a control message indicating that the first packet forwarding path needs to pass through the network node corresponding to the first segment identifier.

18. The second network node of claim 16, wherein when the first segment identifier is the adjacent segment identifier, the instructions further cause the second network node to:
- receive a second segment identifier advertisement message comprising a second segment identifier and a second flag bit, wherein the second segment identifier is a node segment identifier of the third network node; and determine the second flag bit indicates a packet needs to be forwarded through the third network node.

19. The second network node of claim 15, wherein the second network node is a firewall.

20. A system for determining a packet forwarding path, wherein the system comprises:

a second network node configured to generate a first segment identifier advertisement message comprising a first segment identifier and a first flag bit indicating a packet forwarding path needs to pass through a network node corresponding to the first segment identifier; and a first network node configured to:
obtain the first segment identifier advertisement message;
determine the first flag bit indicates a packet needs to be forwarded through the network node corresponding to the first segment identifier; and
obtain a first packet forwarding path comprising the network node corresponding to the first segment identifier, wherein the first packet forwarding path is a primary path;
obtain a second packet forwarding path comprising the second network node, wherein the first packet forwarding path is different from the second packet forwarding path, and wherein the second packet forwarding path is a first backup path of the first packet forwarding path;
receive a first packet comprising a segment list, wherein a topmost segment identifier in the segment list is a second segment identifier corresponding to the primary path;
determine the second network node is unreachable through the primary path;
replace the topmost segment identifier with a third segment identifier corresponding to the first backup path to generate a second packet; and
send the second packet to the second network node.

* * * * *

UNITED STATES PATENT AND TRADEMARK OFFICE
CERTIFICATE OF CORRECTION

PATENT NO. : 12,199,861 B2
APPLICATION NO. : 17/469201
DATED : January 14, 2025
INVENTOR(S) : Cheng Li and Zhibo Hu Page 1 of 1

It is certified that error appears in the above-identified patent and that said Letters Patent is hereby corrected as shown below:

In the Claims

Claim 20, Column 27, Line 20: "identifier; and" should read "identifier;"

Signed and Sealed this
Fourth Day of March, 2025

Coke Morgan Stewart
*Acting Director of the United States Patent and Trademark Office*